United States Patent
Kim et al.

(10) Patent No.: US 9,531,524 B2
(45) Date of Patent: Dec. 27, 2016

(54) METHOD AND APPARATUS FOR WIRELESS COMMUNICATION ON HETEROGENEOUS NETWORKS

(71) Applicant: LG Electronics Inc., Seoul (KR)

(72) Inventors: Bong Hoe Kim, Seoul (KR); Dong Youn Seo, Seoul (KR); Su Hwan Lim, Seoul (KR); Joon Kui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 243 days.

(21) Appl. No.: 14/098,282

(22) Filed: Dec. 5, 2013

(65) Prior Publication Data

US 2014/0204850 A1    Jul. 24, 2014

Related U.S. Application Data

(60) Provisional application No. 61/753,938, filed on Jan. 18, 2013.

(51) Int. Cl.
| | | |
|---|---|---|
| *H04L 5/14* | (2006.01) | |
| *G01R 31/08* | (2006.01) | |
| *H04B 7/00* | (2006.01) | |
| *H04J 3/00* | (2006.01) | |
| *H04L 5/00* | (2006.01) | |
| *H04W 48/10* | (2009.01) | |
| *H04W 48/16* | (2009.01) | |
| *H04L 27/26* | (2006.01) | |

(52) U.S. Cl.
CPC ............ *H04L 5/0078* (2013.01); *H04W 48/10* (2013.01); *H04L 5/0053* (2013.01); *H04L 27/2613* (2013.01); *H04W 48/16* (2013.01)

(58) Field of Classification Search
CPC ...... H04L 5/0078; H04W 48/10; H04W 48/16
See application file for complete search history.

(56) References Cited

U.S. PATENT DOCUMENTS

| | | | | |
|---|---|---|---|---|
| 2010/0061326 A1* | 3/2010 | Lee | ........................ | H04W 88/06 370/329 |
| 2011/0002295 A1* | 1/2011 | Ghosal | .............. | H04W 36/0055 370/331 |
| 2012/0238268 A1* | 9/2012 | Radulescu | ........ | H04W 36/0061 455/435.1 |
| 2013/0088983 A1* | 4/2013 | Pragada | ................. | H04W 16/14 370/252 |
| 2013/0128875 A1* | 5/2013 | Kubota | ................. | H04W 36/08 370/338 |
| 2015/0043366 A1* | 2/2015 | Kneckt | ............... | H04L 43/0852 370/252 |
| 2015/0063095 A1* | 3/2015 | Deng | .................... | H04W 8/005 370/221 |

* cited by examiner

*Primary Examiner* — Faruk Hamza
*Assistant Examiner* — Abu-Sayeed Haque
(74) *Attorney, Agent, or Firm* — Dentons US LLP

(57) ABSTRACT

Disclosed is a method for wireless communication on heterogeneous networks. The method includes receiving, by a user equipment (UE), wireless local area network (WLAN) access information from a base station, performing, by the UE, an initial channel access to an access point (AP) based on the WLAN access information, wherein the WLAN access information includes beacon information to receive a beacon frame from the AP, identity information indicating an identifier of the AP and measurement information indicating a measurement configuration of the UE.

12 Claims, 15 Drawing Sheets

FIG. 5
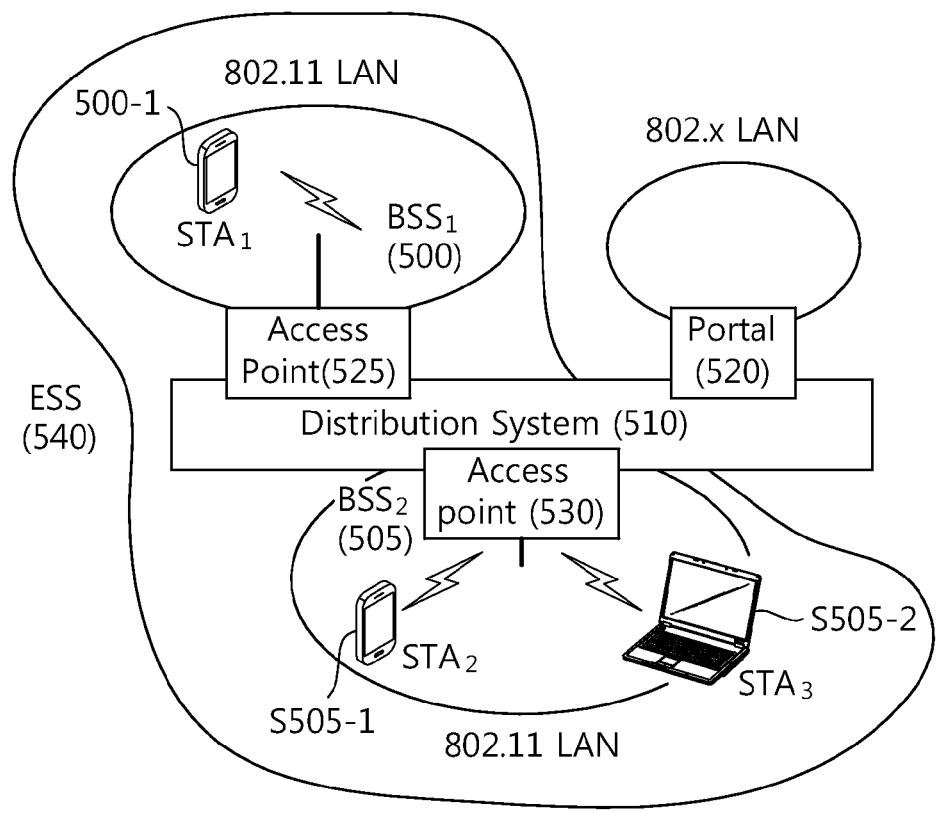
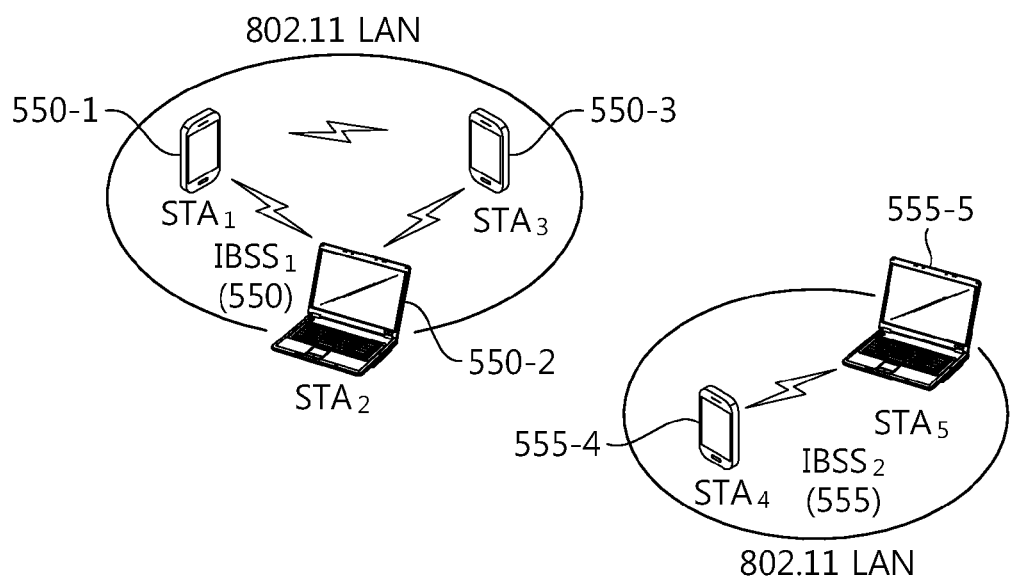

METHOD AND APPARATUS FOR WIRELESS COMMUNICATION ON HETEROGENEOUS NETWORKS

CROSS-REFERENCE TO RELATED APPLICATIONS

This application claims the benefit of priority of U.S. Provisional application 61/753,938 filed on Jan. 18, 2013, which is incorporated by reference in its entirety herein.

BACKGROUND OF THE INVENTION

Field of the Invention

The present invention relates to wireless communication, and more particularly, to a method and apparatus for wireless communication in heterogeneous networks.

Related Art

A long term evolution (LTE), which has been made based on 3rd generation partnership project (3GPP) technical specification (TS) release 8, is a leading next-generation mobile communication standard.

As disclosed in 3GPP TS 36.211 V8.7.0 (2009-05) "Evolved Universal Terrestrial Radio Access (E-UTRA); Physical Channels and Modulation (Release 8)", the physical channels of the LTE may be divided into a physical downlink shared channel (PDSCH), which is downlink channel, and a physical uplink shared channel (PUSCH) and a physical uplink control channel, which are uplink channels.

The PUCCH is an uplink control channel which is used in transmitting uplink control information such as a hybrid automatic repeat request (HARQ), an ACK/NACK signal, a channel quality indicator (CQI), and a scheduling request (SR).

Furthermore, 3GPP LTE-A (advanced), which is an evolved version of the 3GPP LTE, is in progress. Some examples of the technologies, which are introduced in the 3GPP LTE-A, are carrier aggregation and a multiple input multiple output (MIMO) which supports 4 or more antenna ports.

The carrier aggregation uses a plurality of component carriers. The component carrier is defined as the central frequency and bandwidth. One downlink component carrier or a pair of an uplink component carrier and a downlink component carrier correspond to one cell. A terminal, which is provided a service using a plurality of downlink component carriers, is provided services from a plurality of serving cells.

In the time division duplex (TDD) system, the downlink and the uplink use the same frequency. Hence, one or more downlink subframes are associated with the uplink subframe. The term "connected" implies that transmission/reception in the downlink subframe is connected to the transmission/reception in the uplink subframe. For example, if the transmission block is received in a plurality of downlink subframes, the terminal transmits HARQ ACK/NACK for the transmission block in the uplink subframe which is connected to the plurality of downlink subframes.

SUMMARY OF THE INVENTION

An object of the present invention is to provide a method for wireless communication in heterogeneous networks.

Another object of the present invention is to provide an apparatus for wireless communication in heterogeneous networks.

In accordance with an aspect of the present invention, a method for wireless communication on heterogeneous networks includes receiving, by a user equipment (UE), wireless local area network (WLAN) access information from a base station, and performing, by the UE, an initial channel access to an access point (AP) based on the WLAN access information, wherein the WLAN access information includes beacon information to receive a beacon frame from the AP, identity information indicating an identifier of the AP and measurement information indicating a measurement configuration of the UE.

In accordance with another aspect of the present invention, a user equipment (UE) configured for wireless communication on heterogeneous networks includes a transceiver configured to receive radio signals, and a processor operatively coupled with the transceiver and configured to receive, wireless local area network (WLAN) access information from a base station, and perform an initial channel access to an access point (AP) based on the WLAN access information, wherein the WLAN access information includes beacon information to receive a beacon frame from the AP, identity information indicating an identifier of the AP and measurement information indicating a measurement configuration of the UE.

BRIEF DESCRIPTION OF THE DRAWINGS

FIG. 5 is a conceptual diagram illustrating the structure of a wireless local area network (WLAN);

DESCRIPTION OF EXEMPLARY EMBODIMENTS

Figure 1:
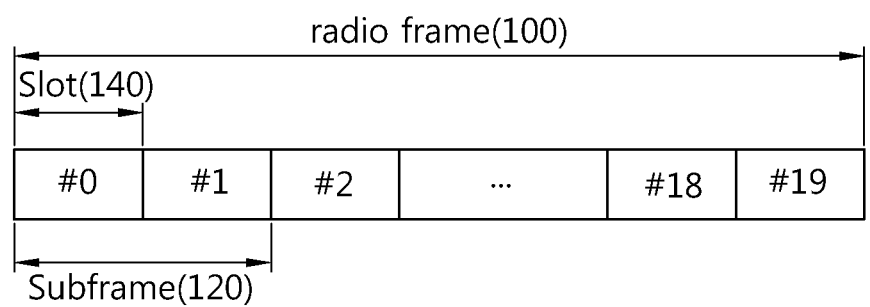
FIG. 1 is a diagram illustrating the structure of a radio frame in a long term evolution (LTE)

Hereinafter, embodiments of the present invention will be described in detail with reference to the accompanying drawings so that they can be readily implemented by those skilled in the art.

Hereinafter, some embodiments of the present invention are described in detail with reference to the accompanying drawings in order for a person having ordinary skill in the art to which the present invention pertains to be able to readily implement the invention. It is to be noted the present invention may be implemented in various ways and is not limited to the following embodiments. Furthermore, in the drawings, parts not related to the present invention are omitted in order to clarify the present invention and the same or similar reference numerals are used to denote the same or similar elements.

The objects and effects of the present invention can be naturally understood or become clear by the following description, and the objects and effects of the present invention are not restricted by the following description only.

The objects, characteristics, and merits will become more apparent from the following detailed description. Furthermore, in describing the present invention, a detailed description of a known art related to the present invention will be omitted if it is deemed to make the gist of the present invention unnecessarily vague. A preferred embodiment in accordance with the present invention is described in detail below with reference to the accompanying drawings.

A user equipment (UE) may be fixed or mobile, and may also be referred to as a mobile station (MS), a mobile terminal (MT), a user terminal (UT), a subscriber station (SS), a wireless device, a personal digital assistant (PDA), a wireless modem, or a handheld device.

A base station refers to a fixed station which communicates with the UE, and may also be referred to as an evolved-NodeB (eNB), a base transceiver system (BTS), or an access point.

FIG. 1 is a diagram illustrating the structure of a radio frame in a long term evolution (LTE).

In 3GPP LTE, the structure of the radio frame 100 is disclosed in 3GPP TS 36.211 V8.2.0 (2008-03) "Technical Specification Group Radio Access Network; Evolved Universal Terrestrial Radio Access (E-UTRA); Physical channels and modulation (Release 8)".

Referring to FIG. 1, the radio frame 100 is composed of 10 subframes 120. One subframe is composed of two slots 140. The radio frame 100 may be indexed based on slots 140 of slot #0 to slot #19, or may be indexed based on the subframes of subframe #0 to subframe #9. For example, subframe #0 may include slot #0 and slot #1.

Time that takes in transmitting one subframe 120 is called a transmission time interval (TTI). The TTI may be a scheduling unit for data transmission. For example, the length of one radio frame 100 may be 10 ms, the length of one subframe 120 may be 1 ms, and the length of one slot may be 0.5 ms.

One slot includes a plurality of orthogonal frequency division multiplexing (OFDM) symbols in the time domain, and includes a plurality of sub-carriers in the frequency domain. In the LTE, the base station uses the OFDMA as an access method in the downlink channel. The OFDM symbol is for expression one symbol period, and may be called as another name depending on the multiple connection scheme. For example, in the uplink channel where the UE transmits data to the base station, the single carrier-frequency division multiple access (SC-FDMA) may be used in a multiple connection scheme. The symbol section where data is transmitted to the uplink channel may be the SC-FDMA symbol.

The structure of the radio frame 100 of FIG. 1 is an embodiment on the frame structure. Hence, the number of subframes 120 included in the radio frame 100, the number of slots 140 included in the subframe 120, or the number of OFDM symbols included in the slot 140 may be modified in various ways, and may be defined as a new radio frame format.

In the structure of the radio frame, the number of symbols including one slot may change depending on which cyclic prefix (CP) is used. For example, when the radio frame uses a normal CP, one slot may include 7 OFDM symbols. When the radio frame uses an extended CP, one slot may include 6 PFDM symbols.

The radio communication system may use a frequency division duplex (FDD) scheme and a time division duplex scheme (TDD) as a duplexing scheme. According to the FDD scheme, the uplink transmission and the downlink transmission may be performed based on different frequency bands. According to the TDD scheme, the uplink transmission and the downlink transmission may be performed using one division scheme based on time based on the same frequency band. The channel response of the TDD scheme may have reciprocal features by using the same frequency band. That is, in the TDD scheme, the downlink channel response and the uplink channel response may be the same in the given frequency domain. Hence, the TDD-based wireless communication system may obtain the channel state information of the downlink channel from the channel state information of the uplink channel. The TDD scheme time-divides the entire frequency band into the uplink transmission and the downlink transmission, and thus the downlink transmission by the base station and the uplink transmission by the terminal cannot be simultaneously performed.

Figure 2:
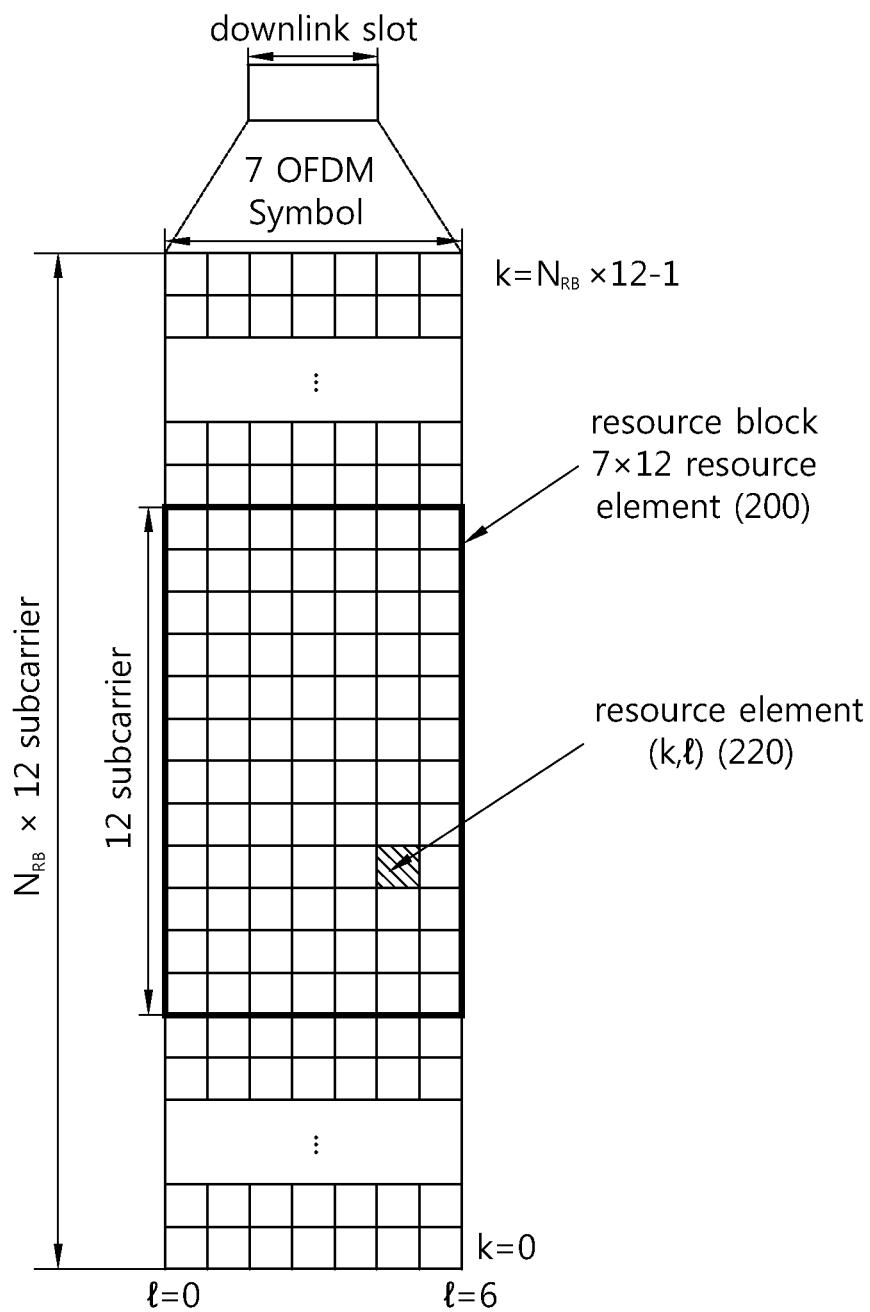
FIG. 2 is a diagram illustrating an example of a resource grid for a downlink slot.

FIG. 2 is a diagram illustrating an example of a resource grid for a downlink slot.

The downlink slot includes a plurality of OFDM symbols in the time domain and includes NRB (number) resource blocks. The NRB, which is the number of resource blocks included in the downlink slot, may be determined according to the downlink transmission bandwidth which is set in the cell. For example, in the LTE system, the NRB may be one of 6 to 110 depending on the used transmission bandwidth. One resource block 200 may include a plurality of sub-carriers in the frequency domain. The structure of the uplink slot may be the same as that of the downlink slot.

Each element on the resource grid is referred to as the resource element 220. The resource element 220 on the resource grid may be identified by (k, l) which is an index pair. Here, k (k=0, . . . , NRBx12-1) is the index of the sub-carrier in the frequency domain, and l (l=0, . . . , 6) is the index of the OFDM symbol in the time domain.

Here, one resource block 200 may include 7 OFDM symbols in the time domain and 7×12 resource elements 220 which are composed of 12 sub-carriers. The size is just an example, and the number of OFDM symbols, which form one resource block 200, and the number of sub-carriers may be changed. The resource block pair indicates the resource unit including two resource blocks.

The number of OFDM symbols, which are included in one slot, may have a different value depending on the CP as described above. Furthermore, the number of resource blocks, which are included in one slot, may be changed depending on the size of the bandwidth.

Figure 3:
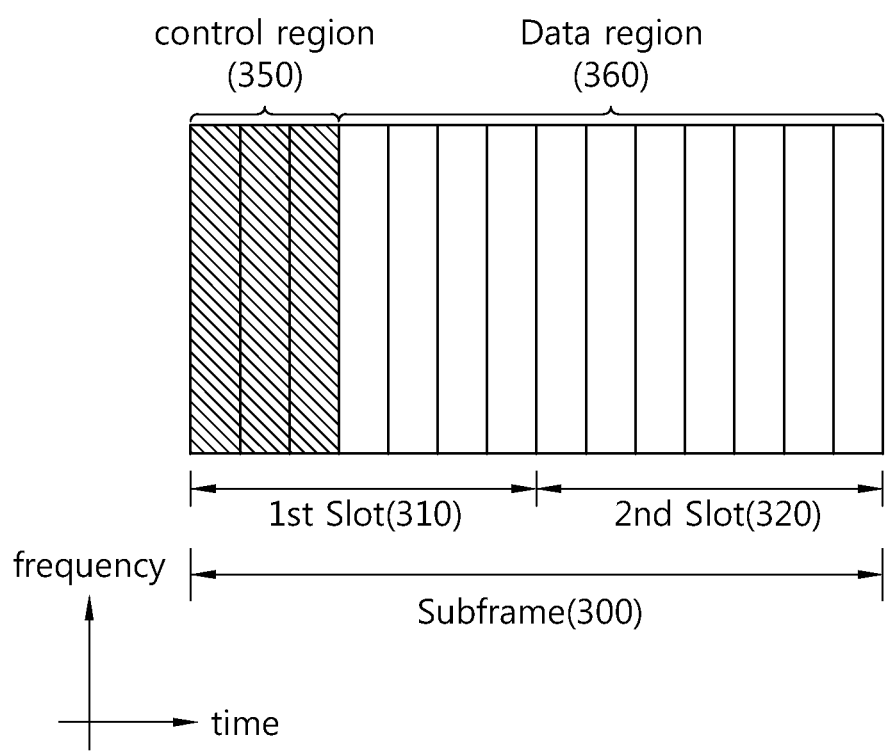
FIG. 3 is a diagram illustrating the structure of a downlink subframe.

FIG. 3 is a diagram illustrating the structure of a downlink subframe.

The downlink subframe 300 may be divided into two slots 310 and 320 based on time. Each slot 310 or 320 includes 7 OFDM symbols in a normal CP. The resource region corresponding to three OFDM symbols (the maximum 4 OFDM symbols for 1.4 Mhz bandwidth), which are temporally ahead and are included in the first slot 310 of the subframe, may be used as the control region 350 to which control channels are allocated. The remaining OFDM symbols may be used as the data region 360 to which the traffic channel is allocated, such as the physical downlink shared channel (PDSCH).

The PDCCH may be a control channel which transmits the resource allocation of the downlink-shared channel (DL-SCH) and the transmission format, the resource allocation information of the uplink shared channel (UL-SCH), the paging information on the PCH, the system information on the DL-SCH, the resource allocation on the upper layer control message such as a random access response which is transmitted on the PDSCH, a set of transmission power control commands on individual UEs within an arbitrary UE group, and activation information of the voice over Internet protocol (VoIP). The plurality of units, which transmit the PDCCH, may be defined within the control region 350. The UE may obtain control data by monitoring a plurality of units which transmit the PDCCH. For example, the PDCCH data may be transmitted to the UE based on the aggregation of one or some continuous control channel elements (CCE). The CCE may become one unit which transmits PDCCH data. The CCE may include a plurality of resource element groups. The resource element group is a resource unit including 4 usable resource elements.

The base station determines the PDCCH format according to the downlink control information (DCI) which is intended to be transmitted to the UE, and attaches the cyclic redundancy check (CRC) to the control information. A unique identifier (radio network temporary identifier (RNTI) is masked according to the owner of the PDCCH or the use. In the case of the PDCCH for a specific UE, a unique identifier of the UE, for example, the cell-RNTI (C-RNTI) may be masked to the CRC. Furthermore, in the case of the PDCCH for the paging message, the paging indication identifier, for example, the paging-RNTI (P-RNTI) may be masked to the CRC. In the case of the PDCCH for the system information block (SIB), the system information-RNTI (SI-RNTI) may be masked to the CRC. In order to indicate a random access response, which is a response to the transmission of a random access preamble, a random access-RNTI (RA-RNTI) may be masked to the CRC.

Figure 4:
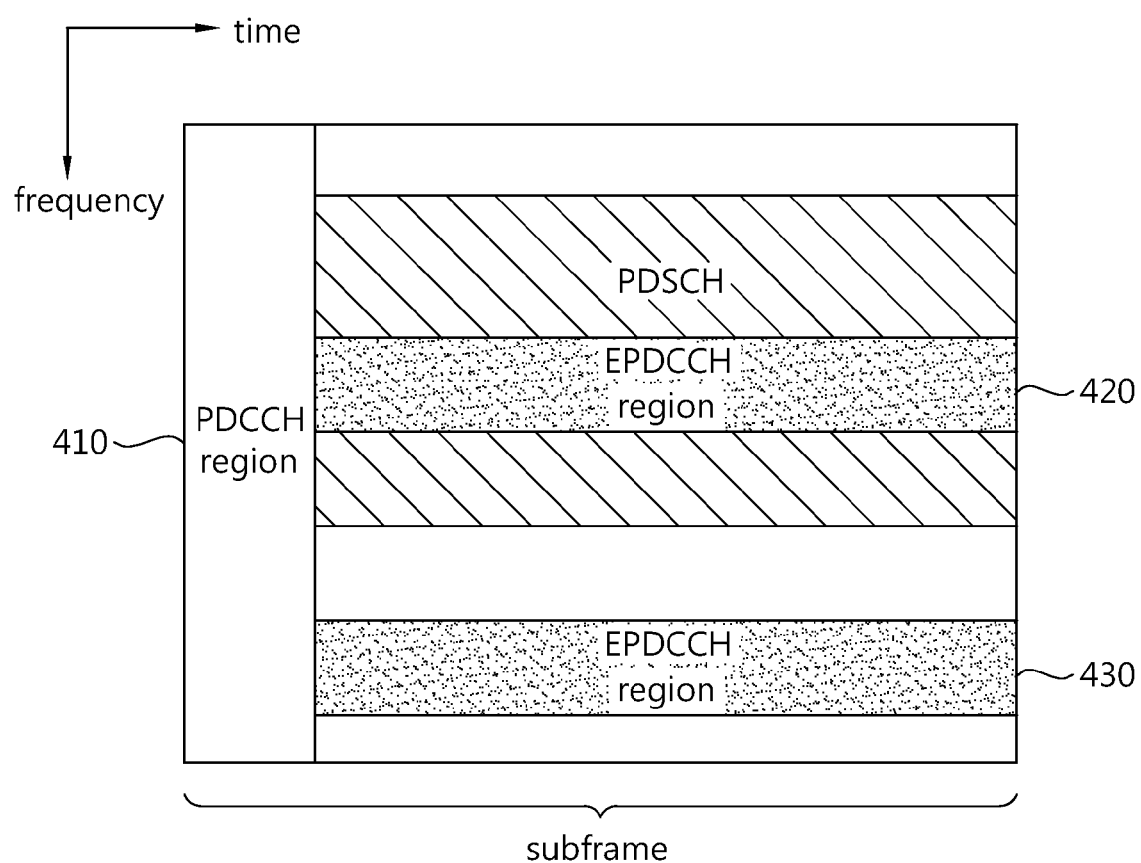
FIG. 4 is a diagram illustrating an example of a subframe having EPDCCH.

FIG. 4 is a diagram illustrating an example of a subframe having EPDCCH.

The subframe may include 0 or one PDCCH region 410 and 0 or more EPDCCH regions 420 and 430.

The EPDCCH regions 420 and 430 are regions where the UE monitors the EPDCCH. The PDCCH region 410 is located within three or the maximum 4 OFDM symbols of the subframe, but the EPDCCH regions 420 and 430 may be flexibly scheduled in the OFDM symbol after the PDCCH region 410.

One or more EPDCCH regions 420 and 430 are designated to the UE, and the UE may monitor the EPDCCH data in the designated in EPDCCH regions 420 and 430.

The base station may inform the UE of the number/location/size of EPDCCH regions 420 and 430 and Information on the subframe for monitoring the EPDCCH through a radio resource control (RRC) message, etc.

The PDCCH may be demodulated based on the CRS in the PDCCH region 410. The DM-RS other than the CRS may be defined for demodulation of the EPDCCH. The DM-RS may be transmitted in the corresponding EPDCCH regions 420 and 430.

The RS sequence for DM-RS is the same as equation 1.

$$r_{l,ns}(m) = \frac{1}{\sqrt{2}}(1 - 2 \cdot c(2m)) + j\frac{1}{\sqrt{2}}(1 - 2 \cdot c(2m+1)) \quad \langle \text{Equation 1} \rangle$$

At this time, m=0, 1, . . . , $12N_{RB}^{max,DL}-1$, and $N_{RB}^{max,DL}$ is the maximum number of RB. The pseudo random sequence generator may be initialized as $c_{init}=(\lfloor n_s/2 \rfloor+1) \cdot (2n_{ID,i}^{EPDCCH}+1) \cdot 2^{16}+n_{SCID}^{EPDCCH}$ at the start of each subframe. "ns" is a slot number within a radio frame, $n_{ID,i}^{EPDCCH}$ is a cell index related with the corresponding EPDCCH region, and $n_{SCID}^{EPDCCH}$ is a parameter which is given from an upper layer signaling.

Each EPDCCH regions 420 and 430 may be used in the scheduling for different cells. For example, the EPDCCH within the EPDCCH region 420 may carry scheduling information for a primary cell, and the EPDCCH within the EPDCCH region 430 may carry scheduling information for a secondary cell.

When the EPDCCH is transmitted through a multiple antenna in the EPDCCH regions 420 and 430, the precoding, which is the same as the EPDCCH, may be applied to the DM-RS within the EPDCCH regions 420 and 430.

When compared with using the CCE as a transmission resource unit by the PDCCH, the transmission resource unit for the EPDCCH is called an enhanced control channel element (ECCE). The aggregation level may be defined as a resource unit which monitors the EPDCCH. For example, when 1 ECCE is the minimum resource for the EPDCCH, L={1, 2, 4, 8, 16} may be defined. A search region may be defined in the EPDCCH region, too. The UE may monitor the EPDCCH candidate based on the aggregation level.

Hereinafter, the operation of the wireless local area network (WLAN) is disclosed.

FIG. 5 is a conceptual diagram illustrating the structure of a wireless local area network (WLAN).

The upper part of FIG. 5 illustrates the structure of an infrastructure network of institute of electrical and electronic engineers (IEEE) 802.11.

Referring to the upper part of FIG. 5, the wireless LAN system may include one or more basic service sets (BSS) 500 and 505. The BSSs 500 and 505 are an aggregation of an access point (AP) and a station (STA) such as an AP 525 and STA1 500-1 which are successfully synchronized and communicate each other, and does not refer to a specific region. The BSS 505 may include one or more STAs 505-1 and 505-2 which may be combined with one AP 530.

The infrastructure BSS may include at least one STA, APs 525 and 530 which provide a distribution service, and a distribution system (DS) 510 which connects a plurality of APs.

The DS 510 may implement an extended service set (ESS) 540 by connecting a plurality of BSSs 505 and 505. The ESS 540 may be used as a term indicating one network which is formed by connection of the plurality of APs 525 and 530 through the DS 510. The AP included in one ESS 540 may have the same service set identification (SSID).

The portable 520 may perform a bridge role of performing connection between the wireless network (IEEE 802.11) and another network (e.g., 802.X).

In the infrastructure network as in the upper part of FIG. 1, the network between the APs 525 and 530 and the network between the APs 525 and 530 and the STAs 500-1, 505-1, and 505-2 may be implemented. However, communication may be performed by setting network between STAs without the APs 525 and 530. A network, which performs communication by setting a network between STAs without the APs 525 and 530, is defined as an ad-hoc network or an independent basic service set (BSS).

The lower part of FIG. 5 is a conceptual diagram illustrating an independent BSS.

Referring to the lower part of FIG. 5, the independent BSS (IBSS) is a BSS which operates at an ad-hoc mode. The IBSS does not include an AP, and thus there is no a centralized management entity. That is, in the IBSS, STAs 550-1, 550-2, 550-3, 555-4, and 555-5 are managed in a distributed manner. In the IBSS, all STAs 550-1, 550-2, 550-3, 555-4, and 555-5 may be formed as mobile STAs, and because connection to the distributed system is not allowed, a self-contained network is formed.

The STA is an arbitrary function medium including a physical layer interface and a medium access control (MAC) which follows the rule of IEEE 802.11 standards, and may broadly include both AP and non-AP station (non-AP STA).

The STA may also be referred to as a mobile terminal, a wireless device, a wireless transmit/receive unit (WTRU), user equipment (UE), a mobile station (MS), a mobile subscriber unit, or a user.

Figure 6:
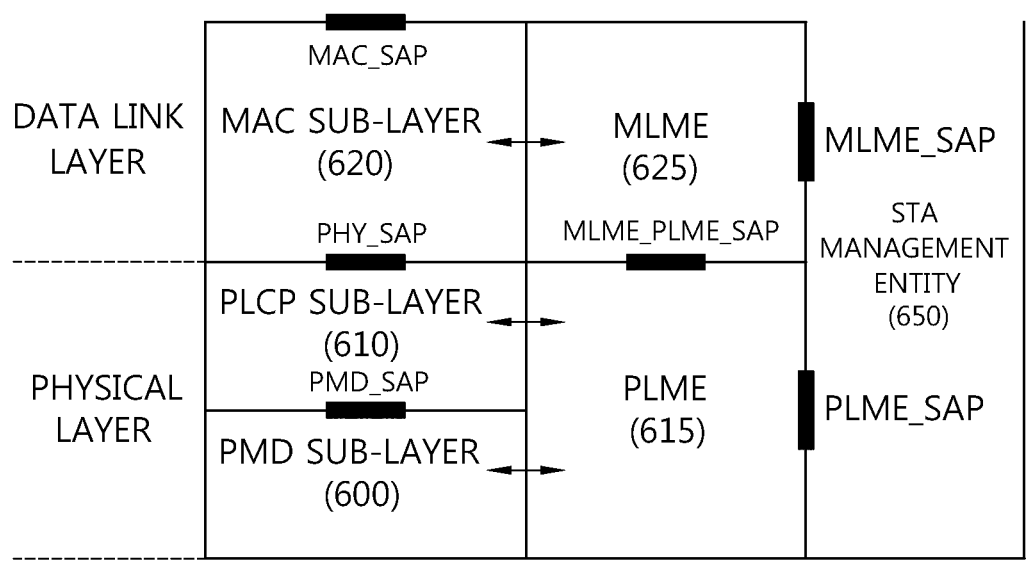
FIG. 6 is a diagram illustrating layer architecture of a wireless LAN system which is supported by IEEE 802.11.

FIG. 6 is a diagram illustrating layer architecture of a wireless LAN system which is supported by IEEE 802.11.

FIG. 6 conceptually illustrates PHY architecture of the wireless LAN system.

The layer architecture of the wireless LAN system may include a medium access control (MAC) sub-layer 620, a physical layer convergence procedure (PLCP) sub-layer 610, and a physical medium dependent (PMD) sub-layer 600. The PLCP sub-layer 610 is implemented such that the MAC sub-layer 620 may operate with the minimum dependence on the PMD sub-layer 600. The PMD sub-layer 600 may perform a role as a transmission interface for transmitting and receiving data between a plurality of STAs.

The MAC sub-layer 620, the PLCP sub-layer 610, and the PMD sub-layer 600 may conceptually include a management entity.

The management entity of the MAC sub-layer 620 is called a MAC layer management entity (MLME) 625 and the management entity of the physical layer is called a PHY layer management entity (PKME) 615. Such management entities may provide an interface where the layer management operation is performed. The PLME 615 may be connected to the MLME 625 and perform a management operation of the PLCP sub-layer 610 and the PMD sub-layer 600, and the MLME 625 may also be connected to the PLME 615 and perform the management operation of the MAC sub-layer 620.

In order to perform a correct MAC layer operation, a STA management entity 650 may exist. The SME 650 may operate as a layer-independent component unit. The MLME, PLME, and SME may transmit and receive information to and from mutual component units based on the primitive.

The operation at each sub-layer may be briefly described below. The PLCP sub-layer 610 transmits the MAC protocol data unit (MPDU), which is received from the MAC sub-layer 620, to the PMD sub-layer 600, or transmits the frame, which comes from the PMD sub-layer 600, to the MAC sub-layer 620, according to the instruction of the MAC layer in a space between the MAC sub-layer 620 and the PMD sub-layer 600. The PMD sub-layer 600 is a PLCP lower layer and may perform data transmission and reception between a plurality of STAs through a wireless medium. The MAC protocol data unit, which is transmitted by the MAC sub-layer 620, is called the physical service data unit (PSDU) in the PLCP sub-layer 610. The MPDU is similar to the PSDU, but when an aggregated MPDU (A-MPDU), which is generated by aggregation of a plurality of MPDUs, is transmitted, individual MPDUs may be different from the PSDU.

The PLCP sub-layer 610 adds an additional field including necessary information by a physical layer transmission and reception device in the process of receiving the PSDU from the MAC sub-layer 620 and transmitting the PSDU to the PMD sub-layer 600. At this time, the additional field may be a PLCP preamble, a PLCP header, tail bits which are needed in returning a convolution encoder into a zero state, etc. The PLCP preamble may play a role of making the reception device to prepare the synchronization function and antenna diversity before the PSDU is transmitted. The data field may include padding bits, a service field including a bit sequence for initializing a scrabbler, and a bit-sequence-encoded coded sequence to which tail bits have been attached. At this time, the encoding scheme may be selected as one of binary convolutional coding (BCC) encoding and low density parity check (LDPC) encoding, depending on the encoding scheme which is supported in the STA which receives the PPDU. The PLCP header may include a field including information on the PLCP protocol data unit (PPDU) to be transmitted.

In the PLCP sub-layer 610, a PLCP protocol data unit (PPDU) is generated by adding a field which is described in the PSDU, and is then transmitted to a reception station via the PMD sub-layer 600 in the PLCP sub-layer 610, and the reception station receives the PPDU, and obtains information, which is needed in restoring data, from the PLCP preamble, PLCP header, so as to perform restoration.

Figure 7:
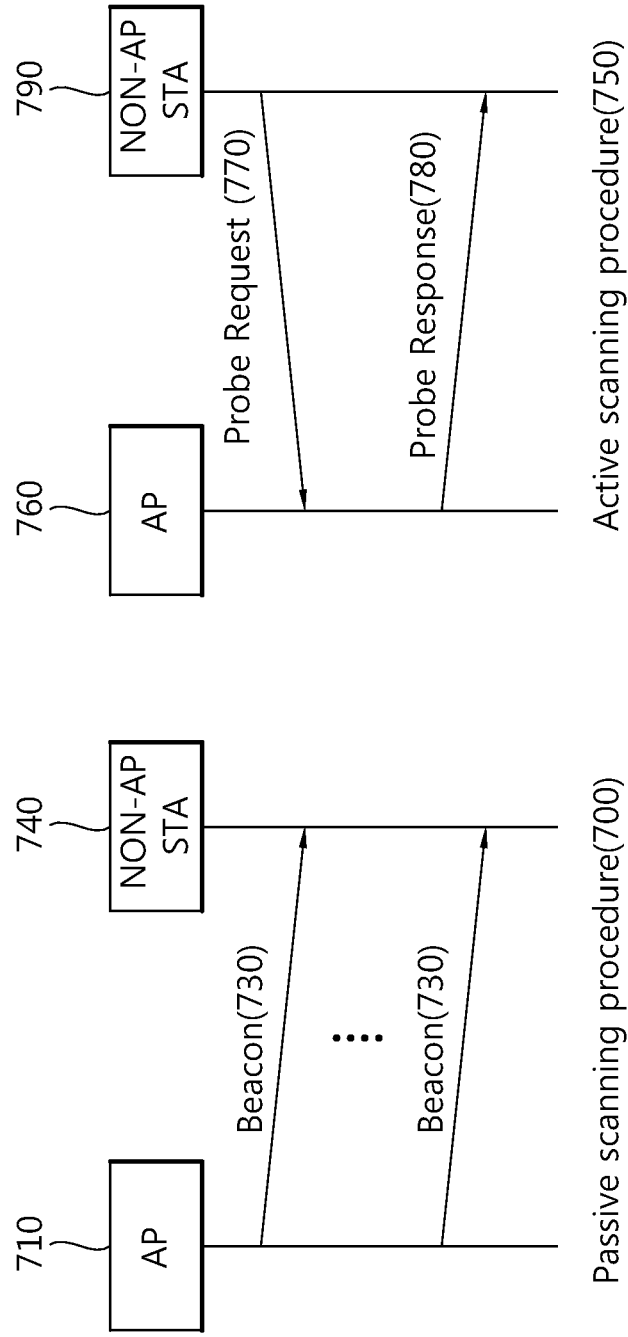
FIG. 7 is a conceptual diagram illustrating a scanning method in a wireless LAN.

FIG. 7 is a conceptual diagram illustrating a scanning method in a wireless LAN.

Referring to FIG. 7, a scanning method may be divided into passive scanning 700 and active scanning 750.

Referring to the left part of FIG. 7, the passive scanning 700 may be performed by a beacon frame 730 which is periodically broadcast by the AP 700. The AP 700 of the wireless LAN broadcasts the beacon frame 730 to the non-AP STA 740 at specific intervals (e.g., every 100 msec). The beacon frame 730 may include information on the current network. The non-AP STA 740 may perform scanning on the AP 710 and the channel for performing the authentication/association process by receiving network information by receiving the beacon frame 730 which is periodically broadcast.

The passive scanning method 700 only needs to receive the beacon frame 730 which is transmitted from the AP 710 without a need for transmission of the frame by the non-AP STA 740. Hence, the passive scanning 700 has an advantage that the overall overhead, which is generated by the data transmission/reception, is small in the network. However, the scanning needs to be manually performed in proportion to the period of the beacon frame 730, and thus there is a disadvantage that the time, which takes in performing scanning, increases. The specific description on the beacon frame is disclosed in IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter, referred to as "IEEE 802.11"). In IEEE 802.11 ai, the beacon frame of another format may be additionally used, and such a beacon frame may be called as a fast initial link setup beacon frame. Furthermore, the measurement pilot frame is a frame including only partial information of the beacon frame, and may be used in the scanning procedure. The measurement pilot frame is disclosed in IEEE 802.11 8.5.8.3 measurement pilot format.

Furthermore, a fast initial link setup (FILS) discovery frame may be defined. The FILS discovery frame is a frame which is transmitted between the transmission periods of the beacon frame at each AP, and may be a frame which is transmitted with a period shorter than that of the beacon frame. That is, the FILS discovery frame is a frame which is transmitted with a period shorter than the transmission period of the beacon frame. The FILS discovery frame may include identification information (SSID, BSSID) of the AP which transmits the discovery frame. The FILS discovery frame may be transmitted before the beacon frame is transmitted to the STA, and thus it is possible for the STA to discover in advance that the AP exists in the channel. The interval, at which the FILS discovery frame is transmitted in one AP, is called a FILS discovery frame transmission interval. Part of the information, which is included in the beacon frame, may be included in the FILS discovery frame and may then be transmitted. The FILS discovery frame may also include information on the transmission time of the beacon frame of the neighboring AP.

Referring to the right part of FIG. 7, the active scanning 750 is a scheme of proactively performing scanning by transmitting a probe request frame 770 to the AP 760 in the non-AP STA 790.

The AP 760 may receive the probe request frame 770 from the non-AP STA 790, wait for random amount of time to prevent a frame collision, and then transmit a probe response frame 780 including network information to the non-AP STA 790. The non-AP STA 790 may obtain network information based on the received probe response frame 780, and stop the scanning process.

In the case of the active scanning 750, the non-AP STA 790 proactively performs scanning, and thus there is an advantage that the scanning time is short. However, the probe request frame 770 needs to be transmitted in the non-AP STA 790, and thus there is a disadvantage that the network overhead for frame transmission and reception increases. The probe request frame 770 is disclosed in IEEE 802.11 8.3.3.9, and the probe response frame 780 is disclosed in IEEE 802.11 8.3.3.10.

After the scanning is completed, the AP and the STA may perform the authentication and association process.

Figure 8:
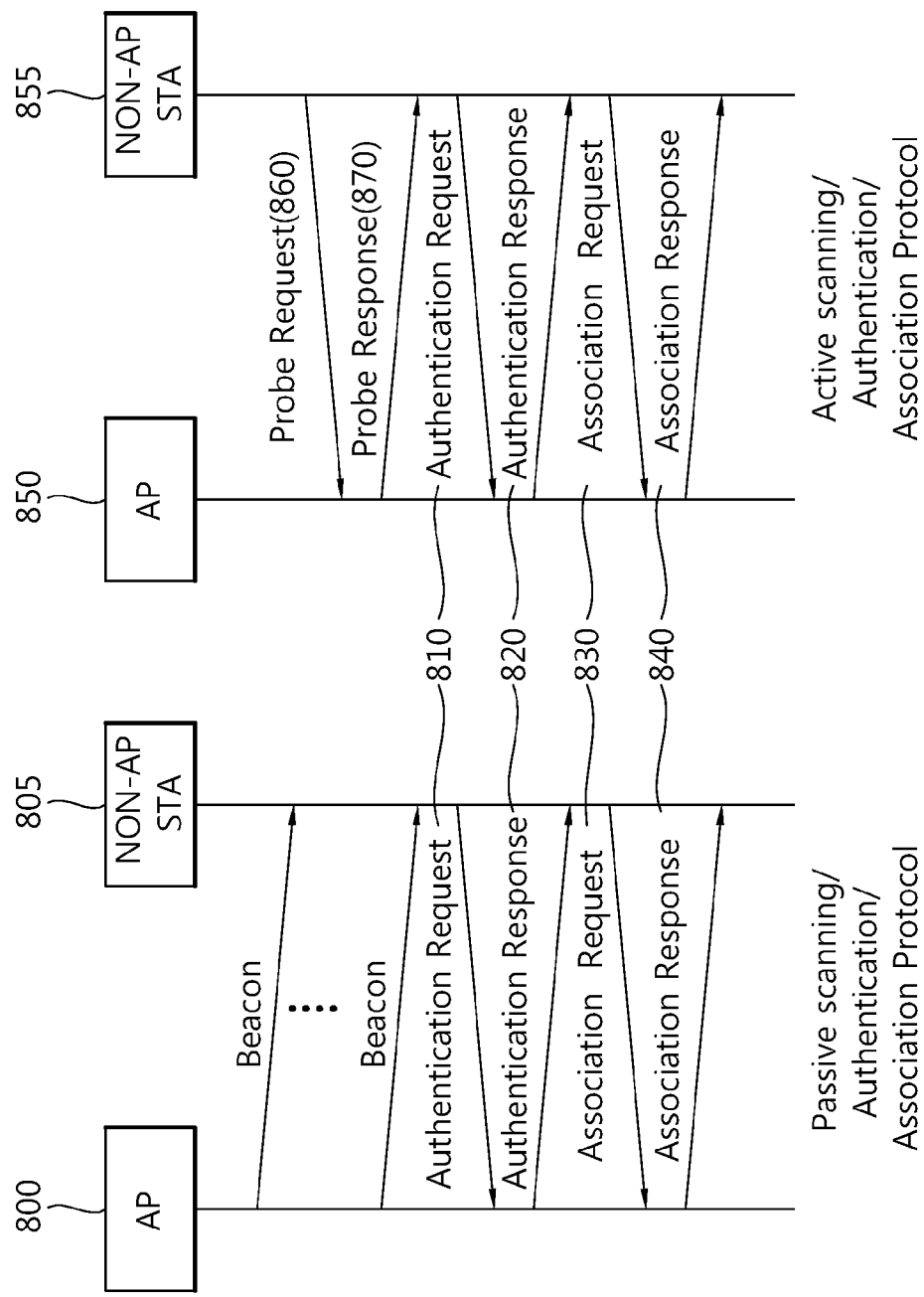
FIG. 8 is a conceptual diagram illustrating an authentication and association process after scanning of AP and STA.

FIG. 8 is a conceptual diagram illustrating an authentication and association process after scanning of AP and STA.

Referring to FIG. 8, after performing the passive/active scanning, the authentication and association with one of the scanned APs may be performed.

The authentication and association process may be performed, for example, through 2-way handshaking. The left part of FIG. 8 is a conceptual diagram illustrating the authentication and association process after the passive scanning, and the right part of FIG. 8 is a conceptual diagram illustrating the authentication and association process after the active scanning.

The authentication and association process may be performed in the same manner by exchanging the authentication request frame 810/the authentication response frame 820 and the association request frame 830/the association response frame 840 between the APs 800 and 850 and the non-AP STAs 805 and 855 regardless of whether the active scanning method has been used or the passive scanning method has been used.

The authentication process may be performed in the non-AP STAs 805 and 855 by transmitting the authentication request frame 810 to the APs 800 and 850. In response to the authentication request frame 810, the authentication response frame 820 may be transmitted from the APs 800 and 850 to the non-AP STAs 805 and 855. The authentication frame format is disclosed in IEEE 802.11 8.3.3.11.

The association process may be transmitted by transmitting the association request frame 830 from the non-AP STAs 405 and 455 to the APs 800 and 805. In response to the association request frame 830, the association response frame 840 may be transmitted from the APs 805 and 855 to the non-AP STAs 800 and 850. The transmitted association request frame 830 includes information on the capability of the non-AP STAs 805 and 855. The APs 800 and 850 may determine whether the non-AP STAs 405 and 355 may be supported based on performance information of the non-AP STAs 805 and 855. When the non-AP STAs 405 and 355 may be supported, the APs 800 and 850 may include information on whether the association request frame 840 is accepted, the reason, and the capability information which may be supported by the APs 800 and 850, in the association response frame 840, and transmit the association response frame 840 to the non-AP STAs 805 and 855. The association frame format is disclosed in IEEE 802.11 8.3.3.5/8.3.3.6.

If the association operation is completed, the transmission and reception of normal data thereafter is performed. When the association operation is not performed, the association may be performed again based on the reason why the association has not been performed, and the association with another AP may be performed.

According to an embodiment of the present invention, when a UE, which connects to the cellular network, tries to connect to the wireless LAN (WLAN) by changing the connection network, the networking operation between the UE, the cellular network, and the WLAN is disclosed. Hereinafter, the cellular network may be an LTE system (LTE or an advanced version of the LTE). Furthermore, the cellular base station may be used as a term indicating the base station such as an e-Node-B which operates in the cellular network. The WLAN system may become IEEE 802.11 or an evolved version of IEEE 802.11 (e.g., 802.11a/b/g/n/ac/ad/af/ah). The AP may be used as a term indicating a device used for data transmission and reception between the WLAN system and the UE.

The UE, which operates in the LTE system, may support an inter-frequency measurement between frequencies for the inter-radio access technology (RAT) handover. The inter-RAT handover is a handover between different systems. In the embodiment of the present invention, a UE's handover between the LTE system and the WLAN system is disclosed. Hereinafter, it is assumed that the UE (e.g., a smartphone) according the embodiment of the present invention is a UE which is implemented to be connected to the cellular network and the WLAN.

When the UE is close to the AP, the data transmission and reception by the UE's connection to the WLAN may be more appropriate for the high-speed data transmission than the data transmission and reception by the UE's connection to the cellular network. Furthermore, networking using the WLAN according to the state of the cellular network may be a method of enhancing the utilization of the network. That is, the data transmission efficiency of the UE needs to be enhanced by performing a handover between the cellular base station and the AP in a specific channel environment. Hence, the cellular base station (e.g., an e-Node-B) may transmit information on the operation of the AP and information on the channel from the WLAN to the UE. Furthermore, the cellular base station may transmit information, which is needed to connect to the AP, to the UE.

Figure 9:
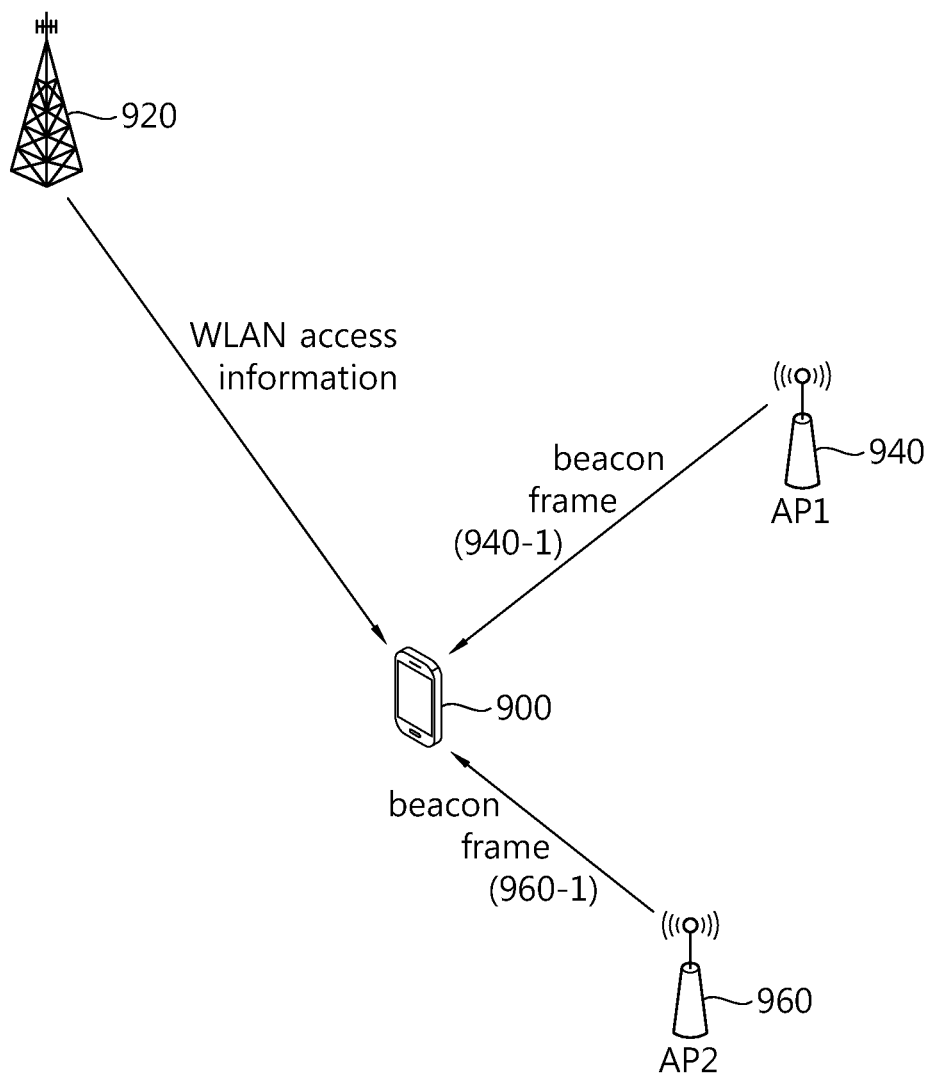
FIG. 9 is a conceptual diagram illustrating operation of a user equipment (UE) in a cellular network and the wireless LAN, according to an embodiment of the present invention.

FIG. 9 is a conceptual diagram illustrating operation of a user equipment (UE) in a cellular network and the wireless LAN, according to an embodiment of the present invention.

In FIG. 9, the method of transmitting, by the cellular base station 920, WLAN access information to the UE 900 is disclosed. The WLAN access information may be information which is used for the UE to access the AP.

Referring to FIG. 9, the cellular base station 920 may transmits the WLAN access information to the UE.

The UE may access the AP based on the WLAN access information which has been transmitted by the cellular base station 920. The UE 900 may monitor beacon frames 940-1 and 960-1 which are transmitted by the APs 940 and 960 based on the WLAN access information. The beacon frames 940-1 and 960-1 may have a frame form which is defined in advance to satisfy backward compatibility. However, when The APs 940 and 960 operate based on IEEE 802.11 standards, which do not satisfy backward compatibility, such as IEEE 802.11af and IEEE 802.11ah, the beacon frames, which are transmitted by the APs 940 and 960, may have an independent beacon frame transmission format. The WLAN access information, which is transmitted by the cellular base station 920 to effectively discover beacon frames 940-1 and 960-1 by the UE 900, may include information on the WLAN system version supported by the APs 940 and 960 (e.g., information on IEEE 802.11 standards supported by the APs 940 and 960). The UE 900 may discover the beacon frames 940-1 and 960-1 transmitted by the APs 940 and 960 based on information on the version of the WLAN system which is received from the base station 920.

Furthermore, information on the beacon frames 940-1 and 960-1, which are transmitted by the APs 940 and 960, may be included in the LWAN access information. For example, the transmission period of the beacon frames 940-1 and 960-1, which are transmitted by the APs 940 and 960, may be 100 ms. If the cellular base station provides information on the beacon frame transmission period of the APs 940 and 960 to the UE 900, the UE 900 may detect the beacon frames 940-1 and 960-1 based on the information on the beacon frame transmission period. Furthermore, the WLAN access information may include information on the transmission time point of the beacon frames 940-1 and 960-1 as well as information on the transmission period of the beacon frames 940-1 and 960-1. Information on the transmission time point of the beacon frames 940-1 and 960-1, which are transmitted by the cellular base station 920 to the terminal 900, may include information on the time offset which is produced based on the timing of the downlink-transmitted sub-frame of the cellular base station 920. Such a time offset may be defined as a term "beacon frame transmission time offset."

For example, it may be assumed that the standard of the downlink transmission timing of the cellular base station 920 is radio frame #0. In this case, the information on the transmission time point of the beacon frames 940-1 and 960-1 may be offset information in 1 ms or 1 us units which are produced based on the downlink transmission timing of radio frame #0. The base station 920 may transmit information on the beacon frame transmission time point to the UE 900. The UE 900 may receive information on the beacon frame transmission time point and monitor the beacon frames 940-1 and 960-1 based on the received information.

The cellular base station 920 may produce information on the transmission time point of the beacon frames 940-1 and 960-1 in a method described below. For example, when the APs 940 and 960 support IEEE 802.11 ai, the APs 940 and 960 may transmit a fast initial link setup (FILS) discovery frame to the UE. The FILS discovery frame is a frame which is transmitted between transmission periods of the beacon frame in respective APs 940 and 960, and may be a frame which is transmitted with a period shorter than the beacon frame. That is, the FILS discovery frame is a frame which is transmitted with a period which is smaller than the transmission period of the beacon frame. The FILS discovery frame may include identifier information (SSID and BSSID) of the APs 940 and 960 which transmit the discovery frame. The FILS discovery frame may be transmitted before the beacon frames 940-1 and 960-1 are transmitted to the STA, and thus the STA may be set in advance that the APs 940 and 960 exist in the channel. The FILS discovery frame may additionally include information on the next target beacon transmission time (TBTT) offset. The information on the next TBTT offset may include information on the beacon frames 940-1 and 960-1 which are transmitted in the APs 940 and 960 after the FILS discover frame. That is, the AP's next TBTT offset may include information on the beacon frames 940-1 and 960-1 of the APs 940 and 960, which are transmitted after the transmitted FILS discovery frame, as the offset information. The cellular base station 920 may determine information on the AP's next beacon frame transmission time based on the AP's next TBTT offset information included in the FILS discovery frame which is transmitted by the APs 940 and 960. The cellular base station may determine the beacon frame transmission time offset based on the AP's next beacon frame transmission time and transmit the determined beacon frame transmission time offset to the UE.

Furthermore, the WLAN access information may include information on the frequency band and/or operation channel where the APs 940 and 960 operate. The cellular base station 920 may transmit information on the frequency band and/or operation channel, where the APs 940 and 960 operate, to the UE 900. The information on the frequency band or operation channel may include information on the frequency band or information on the operation channel index which is defined in the WLAN standards. Furthermore, the cellular base station 920 may provide only the information on the operation channel, where the APs 940 and 960 operate, so that the UE 900 may discover the beacon frames 940-1 and 960-1 which the APs 940 and 960 transmit in the operation channel of the APs 940 and 960. Furthermore, the WLAN access information may include the AP's identifier information such as the SSID or BSSID of the APs 940 and 960. The cellular base station 920 may provide the AP's identifier information such as SSID or BSSID to the UE 900.

Figure 10:
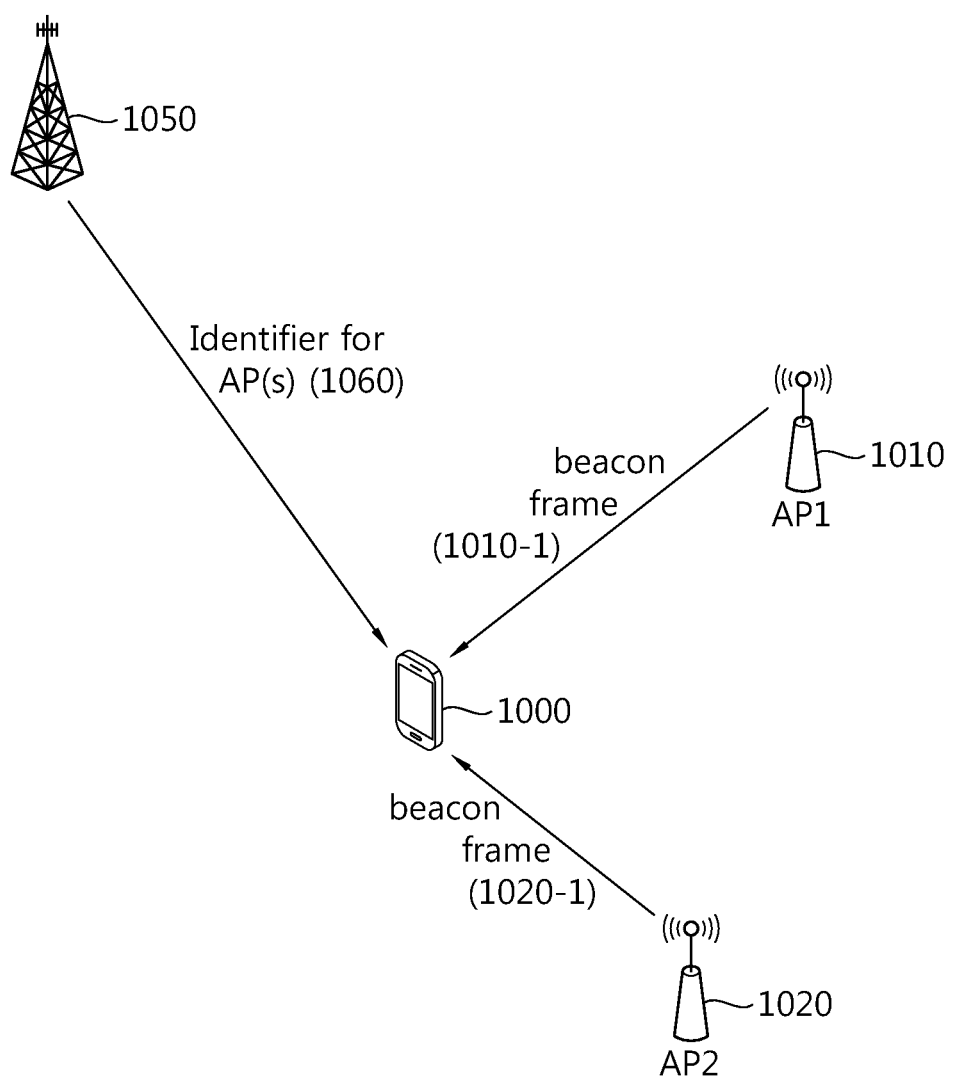
FIG. 10 is a conceptual diagram illustrating operation of the UE in the cellular network and the wireless LAN, according to an embodiment of the present invention.

FIG. 10 is a conceptual diagram illustrating operation of the UE in the cellular network and the wireless LAN (WLAN), according to an embodiment of the present invention.

FIG. 10 shows a method of performing passive scanning when the cellular base station 1050 transmits the identifier information 1060 of the APs 1010 and 1020 to the UE with the WLAN access information.

Referring to FIG. 10, the cellular base station 1050 may the AP's identifier information (SSID) and BSSID) 1060, which is obtained from the neighboring APs 1010 and 1020, to the UE 1000. When there are a plurality of identifier information sets of the obtained neighboring APs 1010 and 1020, the cellular base station 1050 may transmit only the identifier information of a specific AP to the UE 1000. For example, the cellular base station 1050 may transmit only the information on the AP, which may be accessed by the UE 1000, to the UE 1000, based on the location information of the UE 1000.

When the UE 1000 obtains the identifier information of the APs 1010 and 1020 from the cellular base station 1050, the UE 1000 may perform an initial access to the APs 1010 and 102 based on the passive scanning method. For example, when the UE 1000 performs the passive scanning, the UE 1000 may monitor beacon frames 1010-1 and 1020-1 which are transmitted by the APs 1010 and 1020 corresponding to the AP identifier which is transmitted by the cellular base station 1050. When performing passive scanning, the UE 1000 may monitor the beacon frame which is transmitted by each AP based on information on the transmission time point of the beacon frames 1010-1 and 1020-1 of the APs 1010 and 1020 which are transmitted by the cellular base station.

Furthermore, the UE 1000 may additionally receive WLAN-related information such as information on the beacon frame transmission time of respective APs 1010 and 1020 and information on the operation channel of respective APs 1010 and 1020 as well as identifier information 1060 of the APs are received from the cellular base station 1050. The UE 1000 may determine one target AP which the UE 1000 tries to access based on the received WLAN-related information. The UE 1000 may receive the beacon frames by monitoring the channel on which the target AP operates during the beacon frame transmission time of the target AP.

which may be accessed by the UE based on the location information of the UE, to the UE 1100.

When the UE obtains the identifier information 1160 of the AP from the cellular base station 1150, the UE 1100 may perform the initial access to the AP 1110 based on the active scanning method. For example, when the UE performs the active scanning, the UE 1100 may transmit the probe request frame 1100-1 to the AP 1110 based on the identifier information 1160 of the AP which is transmitted by the cellular base station 1150. The UE 1100 may determine the specific AP 1110 as the target AP 1110 for performing the initial access based on the information on the WLAN which is transmitted by the cellular base station 1150. The cellular base station may transmit various information related with another WLAN as well as the identifier information 1160 of the AP to the UE, and the UE 1100 may determine the specific AP 1110 as the target AP based on the information transmitted by the cellular base station 1150. The UE 1100 may access the WLAN by transmitting the probe request frame 1100-1 to the target AP by specifying the identifier SSID and BSSID of the determined target AP. The target AP may transmit the probe response frame 1110-1 to the UE 1000 in response to the probe request frame 1100-1.

The access information may be transmitted to a UE in various methods. For example, the base station may transmit information for connection of the UE to the AP to the UE through radio resource control (RRC) signal, MAC signaling, or L1 signaling such as PDCCH/EPDCCH.

Table 1 below shows WLAN access information which is transmitted from the base station to the UE through RRC signaling.

TABLE 1

```
MeasObjectWLAN ::=        SEQUENCE {
    WLAN-Type             WLAN-Type,
    carrierFreq           CarrierFreqWLAN,
    beaconInterval        ENUMERATED {i100, i200, i400, i800}    DEFAULT 1100,
    beaconTimeOffset      INTEGER(0..800)
    offsetFreq            Q-OffsetRangeInterRAT                               DEFAULT 0,
    cellsToRemoveList     CellIndexList                          OPTIONAL,-- Need ON
    cellsToAddModList     CellsToAddModListCDMA2000              OPTIONAL,-- Need ON
    cellForWhichToReportCGI   SSIDWLAN                           OPTIONAL,-- Need ON
    cellForWhichToReportCGI   BSSIDWLAN                          OPTIONAL,-- Need ON
    cellForWhichToReportWLAN  ENUMERATED {11, 11a, 11b, 11g, 11n, 11ac, 11ad, 11af, 11ah}
                          OPTIONAL,    -- Need ON
    ..
}
```

Figure 11:
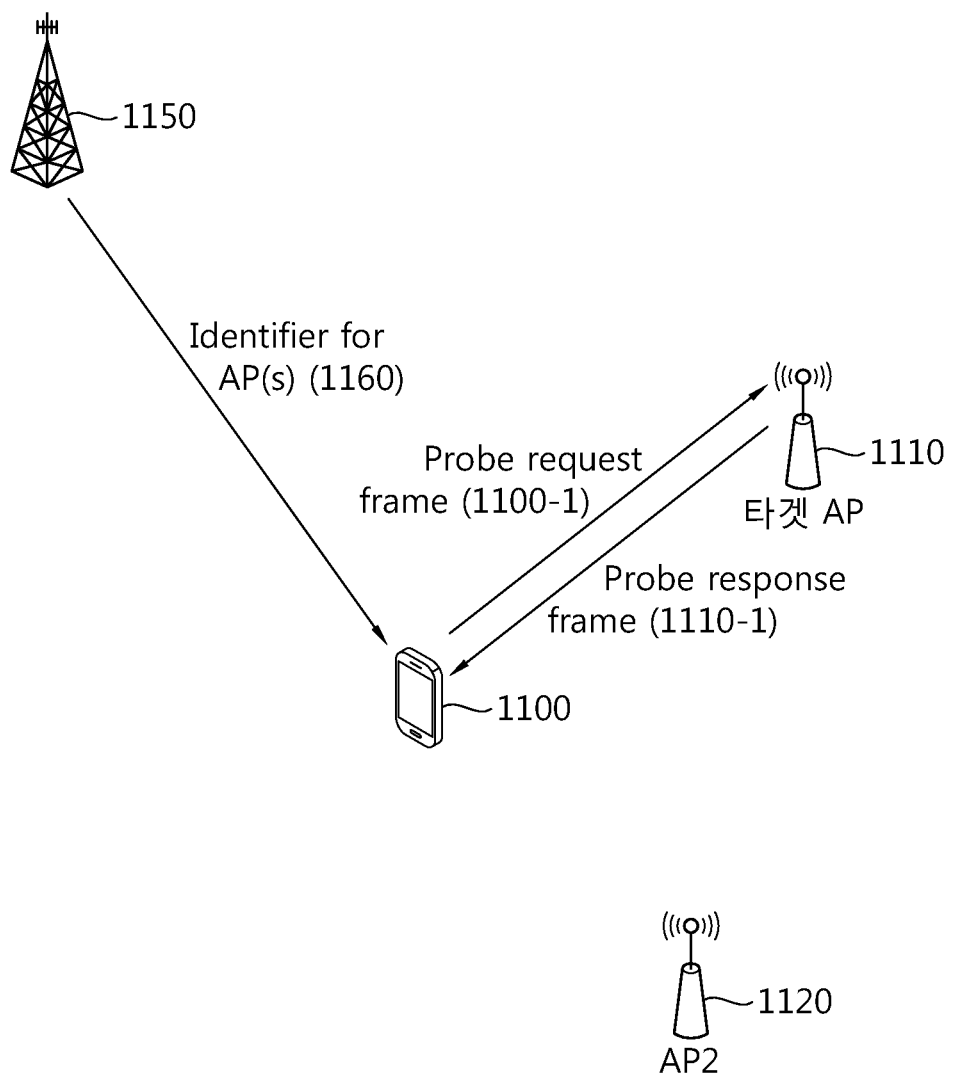
FIG. 11 is a conceptual diagram illustrating operation of the UE in the cellular network and the wireless LAN, according to an embodiment of the present invention.

FIG. 11 is a conceptual diagram illustrating operation of the UE in the cellular network and the wireless LAN, according to an embodiment of the present invention.

FIG. 11 discloses a method of performing active scanning when the cellular base station 1150 transmits the identifier information 1160 of the AP to the UE 1100 with the WLAN access information.

Referring to FIG. 11, the cellular base station 1150 may transmit the identifier information SSID and BSSID 1160 of the AP, which is obtained from the neighboring APs, to the UE 1100. When there are a plurality of obtained identifier information sets of the neighboring APs, the cellular base station 1150 may transmit only identifier information of a specific AP to the UE 1100. For example, the cellular base station 1150 may transmit only the information on the AP, Referring to Table 1, the WLAN access information may include various parameters such as WLAN-Type, carrierFreq, beaconInterval, beaconTimeOffset, offsetFreq, cellsToRemoveList, cellsToAddModList, cellForWhichToReportCGI, and cellForWhichToReportWLAN. The parameter, which is disclosed in Table 1 is just an example on the information which the cellular base station transmits to the UE. That is, the parameter information, which is disclosed in Table 1, is just an example of information for WLAN measurement, and only some of the parameters may be transmitted from the cellular base station to the UE or may be transmitted to the UE through another parameter. According to an embodiment of the present invention, the cellular base station may transmit the WLAN access information to the UE through other various information formats and information transmission methods.

Among the WLAN access information, the WLAN-type may include information on types of the WLAN. The carrierFreq may include information which displays the WLAN operation channel as the absolute frequency. The beaconInterval may include the transmission period of the beacon frame, and the beaconTimeOffset may include information on the difference in the transmission time of the beacon frame for radio frame #0 of the LTE system. Furthermore, the cellForWhichToReportCGI may include information on the SSID or BSSID which is the identifier information of the AP which operates in the WLAN system which is to be accessed by the UE. The cellForWhichToReportWLAN may include information on the version of the WLAN system which is to be accessed by the UE. The cellsToRemoveList is the list of cells to be removed from a neighboring cell list, and the cellsToAddModList is the list of cells to be modified in or added to the neighboring cell list.

After the UE receives the WLAN access information transmitted by the cellular base station, the UE may additionally obtain information on the WLAN and the AP by monitoring the beacon frame which is transmitted in the channel on which the AP operates. The UE may perform the channel access based on the information on the obtained WLAN and AP.

According to an embodiment of the present invention, the UE may receive the beacon frame or the probe response frame and transmit the information obtained in the scanning process to the cellular base station.

Figure 12:
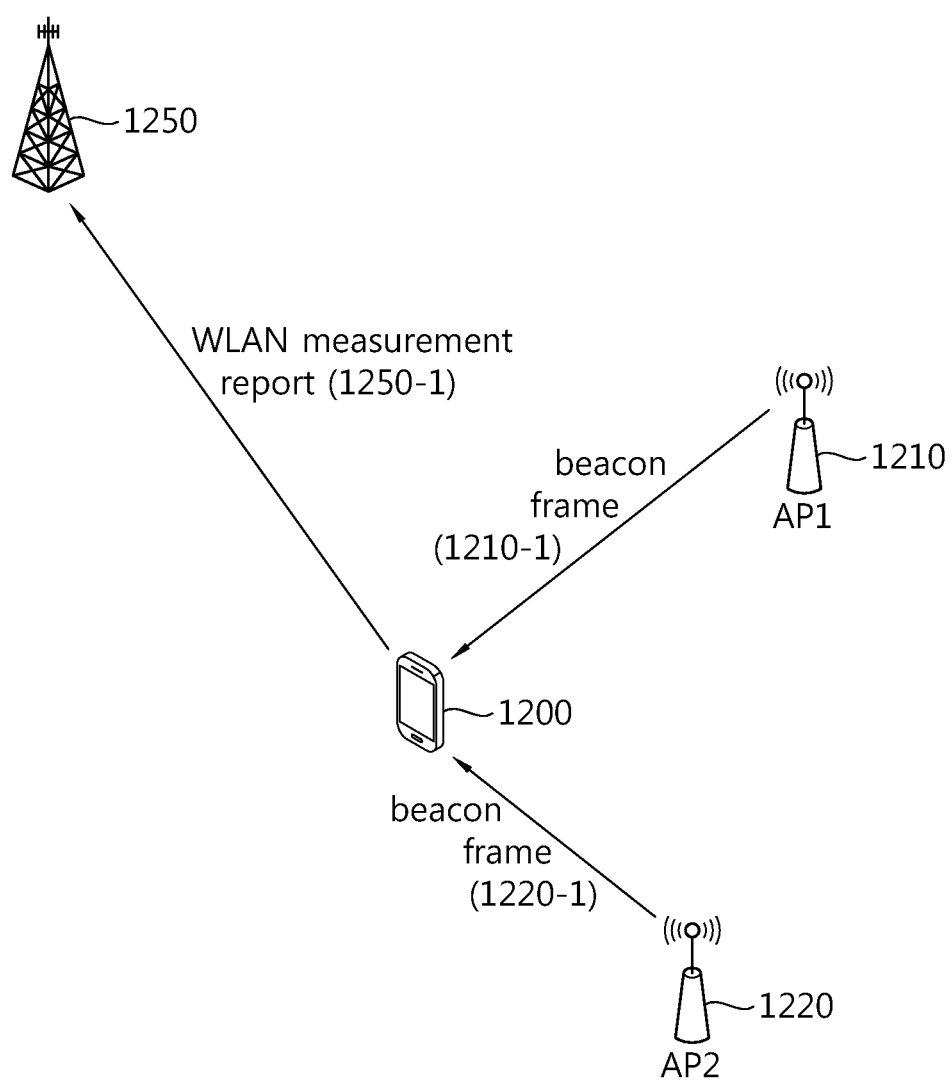
FIG. 12 is a conceptual diagram illustrating operation of the UE in the cellular network and the wireless LAN, according to an embodiment of the present invention.

FIG. 12 is a conceptual diagram illustrating operation of the UE in the cellular network and the wireless LAN, according to an embodiment of the present invention.

FIG. 12 discloses a method of transmitting the WLAN information, which is obtained by the UE 1200, to the cellular base station 1250.

Referring to FIG. 12, the UE 1200 may measure the received signal strength indication (RSSI) of the beacon frames 1210-1 and 1220-1 transmitted by the APs 1210 and 1220 or the RSSI of another frame transmitted by the APs 1210 and 1220. For example, the UE 1200 may measure the RSSI of the frame transmitted by the APs 1210 and 1220 based on the preamble of the frame which is transmitted by the AP. The RSSI of the frame, which is transmitted by the measured AP, may be transmitted to the cellular base station 1250. Furthermore, the UE 1200 may transmit AP-related information, which is included in the received beacon frames 1210-1 and 1220-1 or the probe response frame, to the cellular base station 1250. The cellular base station 1250 may use the information of the AP, which is transmitted by the UE 1200, as information for generating the WLAN access information which is to be transmitted to another UE later.

The WLAN-related information, which is obtained by the UE 1200 and is transmitted to the cellular base station 1250, is called a WLAN measurement report 1250-1. Table 2 below illustrates the WLAN measurement report 1250-1 which the UE 1200 transmits to the cellular base station 1250.

TABLE 2

| | |
|---|---|
| MeasResultListWLAN ::= MeasResultWLAN | SEQUENCE (SIZE (1..maxAPReport)) OF |
| MeasResultWLAN ::= SEQUENCE { | |
| PhysCellID | SSIDWLAN |
| cgi-Info | BSSIDWLAN |
| measResult | SEQUENCE { |
| WLAN-rssi | INTEGER (-5..91) |
| ..., | |
| } | |
| } | |

Referring to FIG. 2, the WLAN measurement report 1250-1 may include, for example, parameters of PhysCellID, cgi-Info, measResult, and WLAN-rssi. The information disclosed in Table 2 is just an example on the WLAN measurement report 1250-1 which the UE 1200 transmits to the cellular base station 1250. That is, the information disclosed in Table 2 is just an example on the WLAN measurement report 1250-1 which is transmitted by the UE 1200, and only some of the information may be transmitted from the UE 1200 to the cellular base station 1250. According to an embodiment of the present invention, the UE 1200 may transmit the WLAN measurement report 1250-1 to the UE 1200 through various information formats and information transmission methods.

The PhyCellID may include information on the SSDI of the detected APs 1210 and 1220. The cgi-Info may include information on the BSSID of the APs 1210 and 1220, and the WLAN-rssi may include information on the RSSI which performs measurement for the preamble of the beacon frames 1210-1 and 1220-1.

According to an embodiment of the present invention, the information, which is used when performing measurement between frequencies of the UE and the measurement between RATs, may be newly set based on the AP operation. Such measurement setting information may be included in the WLAN access information for transmission and may be separately transmitted by another information format.

The UE, which operates in the conventional LTE system, may perform measurement between frequencies and measurement between RATs to satisfy the requirements as shown in Table 3 below.

TABLE 3

| Gap Pattern Id | Measurement Gap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |

In Table 3, the measurement gap length (MGL) may include information on the time which is given to the UE for one time measurement. The measurement gap repetition period (MGRP) may include information on the time gap until the next measurement is performed after the UE performs measurement. The minimum available time for inter-frequency and inter-RAT measurement (Tinter 1) may include information on the amount of the measurement time for which the UE needs to perform to the minimum for 480 ms. Hereinafter, the time period (e.g., 480 ms) for obtaining the minimum available time for inter-frequency and inter-RAT measurement (Tinter 1) may be defined as a term "measurement period." The gap pattern identifier (gap pattern id) may be used to indicate information on the pattern which is used when performing the inter-frequency measurement and inter-RAT measurement.

Referring to Table 3, for example, when the gap pattern id is 0, the minimum available time for inter-frequency and inter-RAT measurement may be 60 ms. In such a case, the UE may use at least 60 ms out of the measurement period 480 ms for the inter-frequency measurement and inter-RAT measurement. The measurement gap length is 6 ms, and thus the UE may perform the measurement for the minimum 10 times during 480 ms.

When the UE performs measurement on the WLAN in the heterogeneous networks, a new measurement setting may be defined based on the operation characteristics of the AP without using measurement setting as described in Table 3 above. The UE may monitor the beacon frame which the PA transmits to perform measurement on the WLAN. When the transmission period of the beacon frame, which is transmitted by the AP, is 100 ms, the setting the measurement gap repetition period as 40 ms/80 ms as described in Table 3 above may not be effective compared to the transmission period of the beacon frame. When the transmission period of the beacon frame, which is transmitted by the AP, is 100 ms, setting the measurement gap repetition period as 100 ms or more may be needed for an effective beacon frame detection of the UE. That is, the cellular base station may set the measurement gap repetition period of the UE based on the information on the transmission period of the beacon frame. Furthermore, the cellular base station may measure the WLAN measurement of the UE so that the UE may perform detection on the beacon frame based on information on the time point when the beacon frame is transmitted.

In order to enhance reliability on the measurement result of the UE, the UE may need to receive a plurality of beacon frames which are transmitted by the AP. Furthermore, the beacon frame, which is transmitted from a plurality of different APs, may need to be received. Hence, the measurement gap repetition period needs to be set again.

Hereinafter, according to an embodiment of the present invention, information, which is set for measurement of the WLAN of the UE, such as a gap pattern identifier, a measurement gap length, a measurement gap repetition period, and the minimum available time for the inter-frequency measurement and inter-RAT measurement, may be expressed as a term "WLAN scanning setting information". The WLAN scanning setting information may be included in the WLAN access information and the WLAN access information may be transmitted from the cellular base station to the UE as described above.

Figure 13:
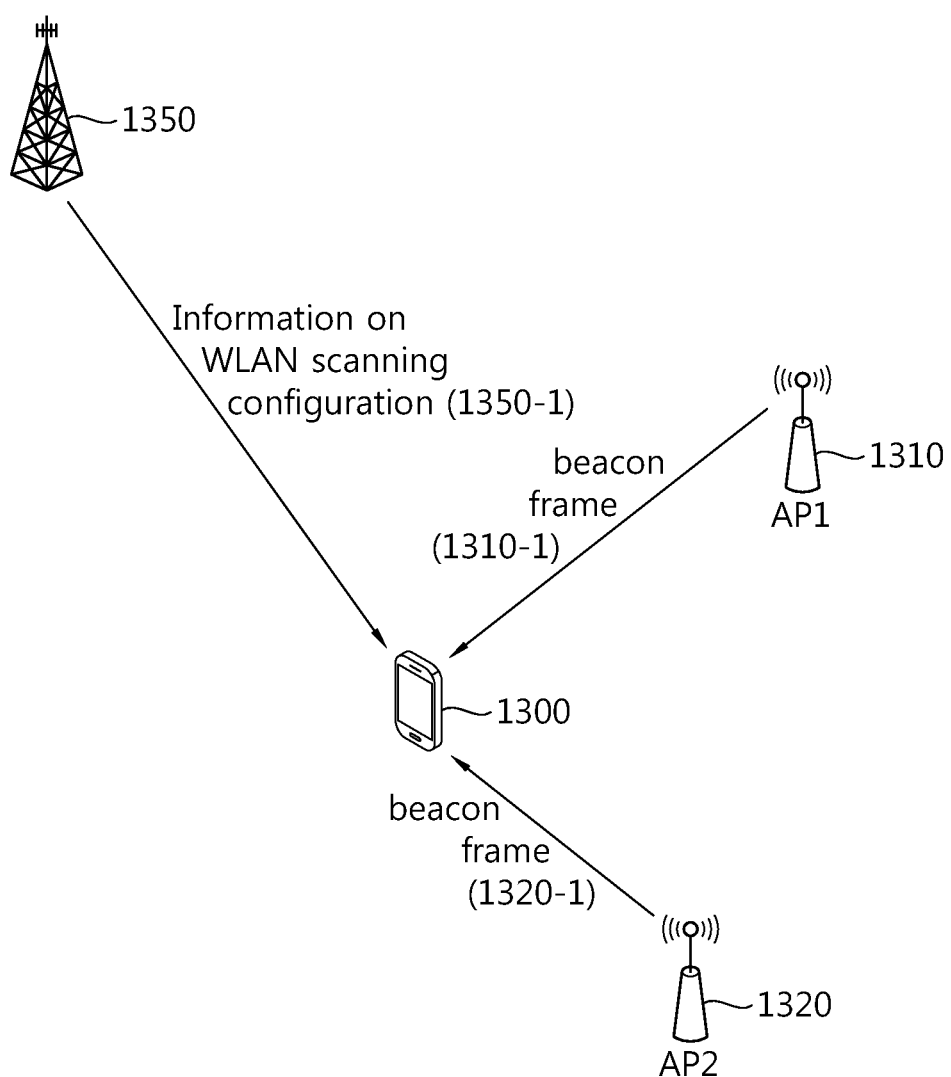
FIG. 13 is a conceptual diagram illustrating operation of the UE in the cellular network and the wireless LAN, according to an embodiment of the present invention.

FIG. 13 is a conceptual diagram illustrating operation of the UE in the cellular network and the wireless LAN, according to an embodiment of the present invention.

FIG. 13 discloses a method of monitoring beacon frames 1310-1 and 1320-1 which are transmitted by APs 1310 and 1320 based on the WLAN scanning setting information 1350-1 which is obtained by the UE 1300.

Referring to FIG. 13, the UE 1300 may set the WLAN scanning setting information 1350-1 in order to perform measurement on the WLAN. The WLAN scanning setting information 1350-1 may newly set the measurement gap repetition period and the minimum available time for inter-frequency measurement and inter-RAT measurement by reflecting the operation of APs 1310 and 1320.

For example, the measurement gap repetition period and the measurement period, which are included in the WLAN scanning setting information 1350-1, may be set based on the transmission period of the beacon frames 1310-1 and 1320-1 of the APs 1310 and 1320 and/or the number of times for measuring the minimum measurement of the UE 1300. For example, it may be assumed that the beacon frame transmission period is 100 ms and the minimum number of times of the UE measurement on the beacon frames 1310-1 and 1320-1 is 10. In such a case, the measurement gap repetition period of the WLAN scanning setting information 1350-1 may be set to 100 ms or 200 ms, and the measurement period may be set to at least 100 ms. When the UE 1300 performs measurement on the APs 1310 and 1320 for a plurality of operation channels, if it is assumed that the UE 1300 performs measurement on the plurality of APs 1310 and 1320, the WLAN scanning setting information 1350-1 may be differently set.

Table 4 below illustrates the WLAN scanning setting information 1350 when the measurement of the UE and the beacon frame which is transmitted with the period of 100 ms is performed at least 10 times. Table 4 may be an embodiment on the WLAN scanning setting information 1350-1 when the UE 1300 performs measurement for 3 or more times per operation channel for three operation channels.

TABLE 4

| Gap Pattern Id) | Measurement Gap Length (MGL, ms) | Measurement Gap Repetition Period (MGRP, ms) | Minimum available time for inter-frequency and inter-RAT measurements during 1200 ms period (Tinter1, ms) | Measurement Purpose |
|---|---|---|---|---|
| 2 | 6 | 100 | 60 | Inter-Frequency WLAN |
| 3 | 6 | 200 | 30 | Inter-Frequency WLAN |

The WLAN scanning setting of Table 4 is just an example which is set based on the transmission period of the beacon frame of the AP and/or the number of times of performance of the minimum measurement of the UE.

The WLAN generally uses the TDD, and thus reciprocity may exist between the downlink and the uplink. The AP of the WLAN, which is based on the reciprocity between the downlink and the uplink, may obtain information on the downlink transmission based on the uplink transmission. Hence, the cellular base station may obtain information on the WLAN downlink channel based on the channel report which the UE transmits, and may obtain information on the downlink channel from the AP.

Figure 14:
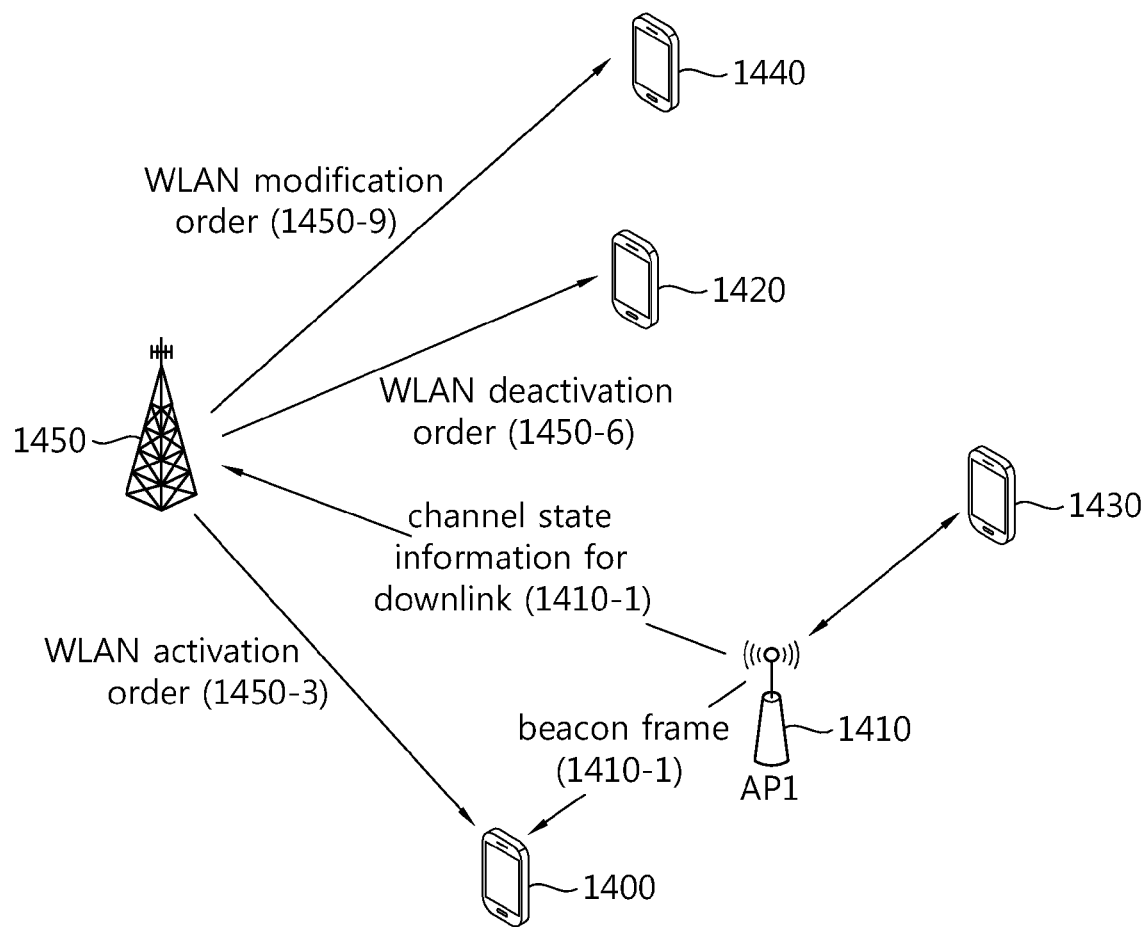
FIG. 14 is a conceptual diagram illustrating operation of the UE in the cellular network and the wireless LAN, according to an embodiment of the present invention.

FIG. 14 is a conceptual diagram illustrating operation of the UE in the cellular network and the wireless LAN, according to an embodiment of the present invention.

FIG. 14 discloses a method of controlling whether to activate the AP channel access of the UE in the cellular base station 1450.

Referring to FIG. 14, the AP 1410 may transmit the channel state information, which is obtained from the uplink data frame which is transmitted by the UE 1430 which connects to the AP 1410, to the cellular base station 1450. For example, the AP 1410 may transmit the downlink channel state information 1410-1 to the cellular base station 1450 through a communication link between the cellular base station 1450 and the AP 1410.

The cellular base station 1450 may obtain information on the WLAN through a communication link with the AP 1410.

The cellular base station 1450 may transmit a WLAN activation command 1450-3 to the UE 1400 so that the UE 1400 may connect to the AP 1410. For example, the cellular base station 1450 may determine whether to allow the UE 1440 to access the WLAN based on the information on the WLAN transmitted by the AP 1410, such as the channel state information and the AP information. When it is determined that the cellular base station 1450 allows the UE 1400 to access the WLAN, the WLAN activation command 1450-3 may be transmitted to the UE 1400. The WLAN activation command 1450-3 may be transmitted to the UE through RRC signaling, MAC signaling, and L1 signaling using PDCCH/EPDCCH. The UE 1400, which receives the WLAN activation command 1450-3, may perform an initial channel access to the AP 1410 when there is an accessible AP 1410 in a surrounding area.

Furthermore, the cellular base station 1450 may transmit the WLAN deactivation command 1450-6 for terminating the connection between the AP 1410 and the UE 1420, to the UE 1420. For example, when it is determined that the cellular base station 1450 does not allow the UE 1420 to access the WLAN, the WLAN deactivation command 1450-6 may be transmitted to the UE 1420. The WLAN deactivation command 1450-6 may be transmitted RRC signaling, MAC signaling, and L1 signaling using PDCCH/EPDCCH in the same manner as that of the WLAN activation command 1450-3. The UE, which receives the WLAN deactivation command 1450-6, may perform data transmission and reception through the cellular base station 1450 without accessing the AP 1410 even when an accessible AP 1410 exists in a surrounding area.

Furthermore, the cellular base station 1450 may transmit a WLAN modification command 1450-9 to the UE to instruct the UE modification of the WLAN system parameter. The WLAN modification command 1450-9 may include, for example, the AP's modified beacon transmission period, and the AP's modified operation channel information. The WLAN modification command 1450-9 may also be transmitted through RRC signal, MAC signal, and L1 signaling using PDCCH/EPDCCH. The UE 1440 may perform an access to the AP based on the WLAN information which modified based on the WLAN modification command 1450-9.

Figure 15:
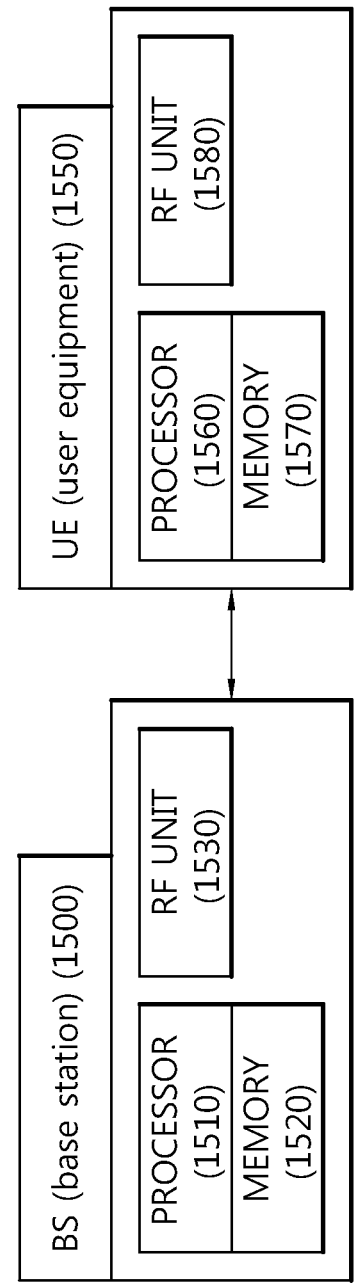
FIG. 15 is a block diagram illustrating a system for wireless communication, according to an embodiment of the present invention.

FIG. 15 is a block diagram illustrating a system for wireless communication, according to an embodiment of the present invention.

Referring to FIG. 15, the base station 1500 includes a processor 1510, a memory 1520, and a RF frequency unit 1530. The memory 1520 is connected to the processor 1510 and stores various information sets for operating the processor 1510. The RF unit 1520 is connected to the processor 1410, and transmits and/or receives radio signals. The processor 1510 implements suggested functions, processes, and/or methods. In the embodiments described above, the operation of the base station may be implemented by the processor 1510.

For example, the processor 1410 may be implemented to generate WLAN access information and transmit the generated WLAN access information to the UE. The WLAN access information may include information on the WLAN system version, which is needed for the UE to connect to the WLAN, and the information on the beacon frame which is transmitted by the AP.

The wireless device 1550 may include a processor 1560, a memory 1570, and an RF unit 1580. The memory 1570 is connected to the processor 1560 and stores various information sets for operating the processor 1560. The RF unit 1580 is connected to the processor 1560 and transmits and/or receives radio signals. The processor 1560 implements suggested functions, processes, and/or methods. In the embodiments described above, the operation of the wireless device may be implemented by the processor 1560.

For example, the processor 1560 may be implemented to perform a channel access based on the WLAN access information which is received from the base station. The WLAN access information may include information on the beacon frame which is transmitted from the AP, the identification information of the AP, and information for measuring the WLAN by the UE.

The processor may include an application-specific integrated circuit (ASIC), another chipset, a logic circuit, and/or a data processor. The memory may include a read-only memory (ROM), a random access memory (RAM), a flash memory, a memory card, a storage medium, and/or another storage device. The RF unit may include a baseband circuit for processing radio signals. When embodiments are implemented by software, the above-described schemes may be implemented as a module (process, function, etc.) for performing the above-described function. The module is stored in the memory, and may be executed by the processor. The memory may exist inside or outside the processor, and may be connected to the processor by various well-known parts.

According to the present invention, data which is to be transmitted to the UE based on the base station and the AP, is distributed, thereby enhancing the transmission efficiency.

A person having ordinary skill in the art to which the present invention pertains may change and modify the present invention in various ways without departing from the technical spirit of the present invention. Accordingly, the present invention is not limited to the above-described embodiments and the accompanying drawings.

In the above exemplary system, although the methods have been described based on the flowcharts in the form of a series of steps or blocks, the present invention is not limited to the sequence of the steps, and some of the steps may be performed in a different order from that of other steps or may be performed simultaneously to other steps. Furthermore, those skilled in the art will understand that the steps shown in the flowchart are not exclusive and the steps may include additional steps or that one or more steps in the flowchart may be deleted without affecting the scope of the present invention.

What is claimed is:

1. A method for performing an inter-radio access technology (RAT) handover, the method comprising:
    receiving, by a user equipment (UE), wireless local area network (WLAN) access information from a base station, the WLAN access information including measurement information indicating a measurement configuration for the UE, identity information indicating an identifier of an access point (AP), and beacon information for receiving a beacon frame from the AP;
    receiving, by the UE, the beacon frame from the AP based on the beacon information;
    measuring, by the UE, a value associated with the beacon frame based on the measurement information; and
    performing, by the UE, initial channel access to the AP when a result of a comparison between the measurement configuration and the measured value associated with the beacon frame meets a predefined requirement for a minimum available time for inter-RAT handover,
    wherein the beacon information includes a beacon frame transmission time offset and operation channel information, the beacon frame transmission time offset indicating a timing of a beacon frame transmitted by the AP and the timing of a beacon frame calculated in units of time used to transmit downlink data by the BS, the operation channel information indicating an operating channel of the AP.

2. The method of claim 1,
    wherein the UE performs the initial channel access by monitoring the beacon frame on the operating channel during a timer interval determined based on the beacon frame transmission time offset.

3. The method of claim 1,
    wherein the identity information includes at least one of a service set identifier (SSID) of the AP and a basic service set identifier (BSSID) of the AP, and
    wherein the UE performs the initial channel access by monitoring the beacon frame from the AP.

4. The method of claim 1,
    wherein the identity information includes at least one of a service set identifier (SSID) of the AP and a basic service set identifier (BSSID) of the AP, and
    wherein the UE performs the initial channel access by transmitting a probe request frame to the AP.

5. The method of claim 1,
    wherein the measurement configuration includes a measurement gap repetition period, the measurement gap repetition period indicating a time interval used for monitoring the beacon frame, and
    wherein the measurement gap repetition period is determined based on a transmission period of the beacon frame.

6. The method of claim 1, wherein the measuring of the value associated with the beacon frame comprises measuring a received signal strength indication (RSSI) of the beacon frame.

7. A user equipment (UE) configured for performing an inter-radio access technology (RAT) handover, the UE comprising:
    a transceiver that receives radio signals; and
    a processor, operatively coupled with the transceiver, that:
    controls the transceiver to receive, wireless local area network (WLAN) access information from a base station, the WLAN access information including measurement information indicating a measurement configuration for the UE, identity information indicating an identifier of an access point (AP), and beacon information for receiving a beacon frame from the AP;
    controls the transceiver to receive the beacon frame from the AP based on the beacon information,
    measures a value associated with the beacon frame based on the measurement information; and
    performs initial channel access to the AP when a result of a comparison between the measurement configuration and the measured value associated with the beacon frame meets a predefined requirement for a minimum available time for inter-RAT handover,
    wherein the beacon information includes a beacon frame transmission time offset and operation channel information, the beacon frame transmission time offset indicating a timing of a beacon frame transmitted by the AP and the timing of a beacon frame calculated in units of time used to transmit downlink data by the BS, the operation channel information indicating an operating channel of the AP.

8. The UE of claim 7,
    wherein the UE performs the initial channel access by monitoring the beacon frame on the operating channel during a timer interval determined bassed on the beacon frame transmission time offset.

9. The UE of claim 7,
    wherein the identity information includes at least one of a service set identifier (SSID) of the AP and a basic service set identifier (BSSID) of the AP, and
    wherein the UE performs the initial channel access by monitoring the beacon frame from the AP.

10. The UE of claim 7,
wherein the identity information includes at least one of a service set identifier (SSID) of the AP and a basic service set identifier (BSSID) of the AP, and
wherein the UE performs the initial channel access by transmitting a probe request frame to the AP.

11. The UE of claim 7,
wherein the measurement configuration includes a measurement gap repetition period, the measurement gap repetition period indicating a time interval used for monitoring the beacon frame, and
wherein the measurement gap repetition period is determined based on a transmission period of the beacon frame.

12. The UE of claim 7, wherein the value associated with the beacon frame comprises a received signal strength indication (RSSI) of the beacon frame.

\* \* \* \* \*